United States Patent [19]

Knight

[11] 4,405,946

[45] Sep. 20, 1983

[54] TELEVISION SIGNAL CONVERTING APPARATUS PROVIDING AN ON-SCREEN TUNING DISPLAY

[75] Inventor: Stanley P. Knight, Cranbury, N.J.

[73] Assignee: RCA Corporation, New York, N.Y.

[21] Appl. No.: 348,675

[22] Filed: Feb. 16, 1982

[51] Int. Cl.³ .............................................. H04N 5/50
[52] U.S. Cl. .................................. 358/192.1; 358/183
[58] Field of Search ................ 358/192.1, 85, 86, 183, 358/191.1

[56] References Cited

U.S. PATENT DOCUMENTS

| | | | |
|---|---|---|---|
| 3,891,792 | 6/1975 | Kimura | 340/726 |
| 3,984,828 | 10/1976 | Beyers, Jr. | 340/324 AD |
| 4,051,524 | 9/1977 | Baxter | 358/192.1 |
| 4,303,937 | 12/1981 | Cook | 358/86 |
| 4,317,215 | 2/1982 | Tabata et al. | 455/5 |
| 4,356,509 | 10/1982 | Skerlos | 358/85 |

OTHER PUBLICATIONS

New Color TV Permits Display of Selected Channel Numbers on Screen, JEI-JAP Electron Ind (Japan), vol. 19, No. 9, pp. 14-15, Sep. 14, 1972.
A Low Cost, High Performance Digital TV Tuning System, Dreske, Jan. 1977, IEEE Trans on Consumer Elec. Feb, 1977, pp. 38-42.
Data Sheet, Models DSX Converter & DRX Remote Controlled Converter, Jerrold Div., General Instrument Corp., 1980.
Data Sheet, Models 5810 & 910 Converter/Descramblers, Magnavox CATV Systems, Inc., 1980.
Data Sheet, Model TC35 Converter Decoder, Oak Communications, Inc., 1980.
Data Sheet, Series 6700 Set-Top Terminal, Scientific Atlanta, date unknown.
Data Sheet, SSAVI-1, American Television & Communications Corp., date unknown.
SFT100 Video Disc Player Technical Manual, RCA Corp., 1980, pp. 59-61.
H. Blatter et al., "Infrared Remote Control for Color-Trak Television Receivers", RCA Engineer, vol. 25, No. 6, 1980, pp. 34-37.
RCA Television Service Data, File 1981, C-3, pp. 1, 3, 8-14, 23-25 & 38-43; and C-3-S1, pp. 1, 2, 6-10.
Data Sheets, MM5840, MM5841, MM58106, MM58146 TV Display Circuits, National Semiconductor Corp.
H. F. Prosser, "Set Top Adapter Considerations for Teletext", IEEE Transactions on Consumer Electronics, vol. CE-25, No. 3, Jul. 1979, pp. 393-399.
R. H. Baer, "Tele-Briefs, A Novel User-Selectable Real Time News Headline Service for Cable TV", IEEE Transactions on Consumer Electronics, vol. CE-25, No. 3, Jul. 1979, pp. 406-408.

Primary Examiner—Michael A. Masinick
Attorney, Agent, or Firm—E. M. Whitacre; P. J. Rasmussen; C. A. Berard, Jr.

[57] ABSTRACT

In a signal converting apparatus such as one including demodulation and remodulation apparatus for converting RF cable carriers to RF carriers having frequencies corresponding to broadcast frequencies, a character generator is coupled to the tuning selector to generate characters representative of the channel number of the selected cable carrier. The character representative signals are combined with the demodulated base-band signals before remodulation. As a result, the television receiver coupled to the cable converter will produce an on-screen display of the channel number of the selected cable channel. Similar apparatus may be employed to identify a video cassette recorder or video disc player as the source of television signals on the screen of a television receiver.

9 Claims, 1 Drawing Figure

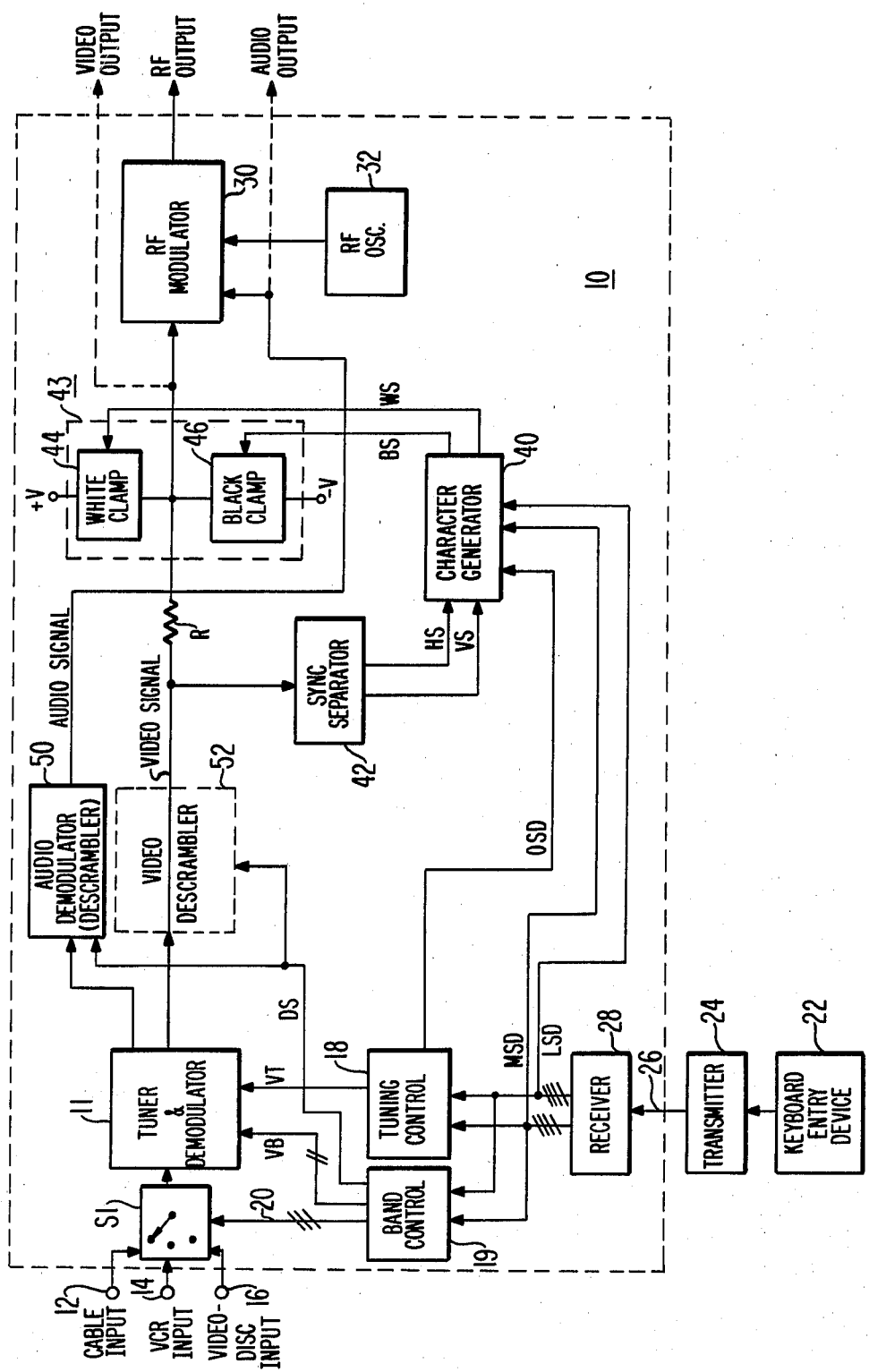

TELEVISION SIGNAL CONVERTING APPARATUS PROVIDING AN ON-SCREEN TUNING DISPLAY

The present invention relates to a television signal converting apparatus which provides an indication of tuning information which is displayed on the screen of a television receiver to which the converter is coupled.

Present cable converters used in conjunction with cable television (CATV) systems can provide an indication of a selected cable channel by means of illuminated push buttons or by a digital display on the converter itself. The television receiver to which the output of a converter is coupled also provides a numerical indication of the channel to which it is tuned. Because a cable converter typically converts all the cable RF carriers to the frequency of either VHF channel 3 or VHF channel 4, the TV receiver must be tuned to either channel 3 or 4. Accordingly, the channel numbers displayed by the cable converter and the TV receiver will generally be different and therefore possibly confuse viewers. In addition, where the display devices of the converter, which usually is placed near or on the receiver, are relatively small in size, it can be difficult for the viewer to determine which cable channel has been selected without leaving his viewing position. The same problems can, of course, occur with satellite converters. Similar problems can occur when a video cassette recorder (VCR) or video disc player (VDP) serves as the television signal source for the television receiver in that a viewer may not be provided with an unambiguous and readily visible indication of the active source of television signals.

It is herein recognized that the above disadvantages can be avoided if an unambiguous and clearly visible tuning indication is displayed on the screen of the TV receiver. Moreover, the cost of the signal converter can be substantially reduced by eliminating the display devices from the converter, VCR or VDP.

To this end, the signal converting apparatus of the present invention, which may be a cable or satellite converter, VCR or VDP or any similar apparatus, comprises apparatus for developing a video signal from a selected television signal source and for extracting picture synchronization signals from the signal. Character signals representing the selected television signal generated by a character generator in synchronism with the synchronization signals are combined with the original video signal. Means are provided to supply the resultant video signal to the video signal processing section of a television receiver. As a result, when the resultant video signal is processed to produce an image, an on-screen indication of the source of the original television signal is produced.

The sole FIGURE of the drawing is a schematic diagram in block form of an apparatus embodying the present invention. In the FIGURE, slash marks on a connection path indicate the number of signals and conductors in that path.

In signal converter 10 of the FIGURE, tuner and demodulator unit 11 receives RF carriers modulated with television information through switch S1. Individual carriers are selected, heterodyned and thereafter demodulated by tuner and demodulator unit 11 to produce a video signal in the base-band frequency range as in a conventional TV receiver. Switch S1 includes a plurality of input terminals 12, 14 and 16 by which various RF TV signal sources, such as a cable distribution system, VCR or VDP, respectively, may be coupled to device 11.

Viewer selection of a desired RF input and channel is accomplished by entry of a two-digit number via keyboard entry unit 22. The most significant digit MSD and the least significant digit LSD are coupled to tuning control unit 18 and band control unit 19. In response, band control unit 19 develops an input selection signal 20 which determines the one of input terminals 12, 14 or 16 to which switch S1 makes connection. E.g., S1 can comprise either an electro-mechanical switching arrangement employing relays or an electronic switching arrangement employing PIN diodes.

Band control unit 19 also develops band signals VB which determine the specific frequency band in which the tuner portion of unit 11 is tuned. Tuning control unit 18 develops tuning signal VT which determines the specific RF carrier tuned by the tuner portion of unit 11.

Although keyboard 22 can be directly coupled to tuning control unit 18, it is often desirable that a remote control arrangement be employed. For that purpose, a remote control transmitter 24 and remote control receiver 28 are interposed between keyboard 22 and tuning control unit 18 and band control unit 19. The information developed by keyboard 22 is transmitted by transmitter 24 to receiver 28 and then to tuning control unit 18 and band control unit 19. The transmission medium, indicated as 26, is preferably an infrared (IR) signal, although an ultrasonic acoustic signal would also be satisfactory.

Apparatus for tuning and demodulating RF signals including portions corresponding to tuning selector and demodulator device 11, tuning control unit 18, band control unit 19, remote control receiver 28, remote control transmitter 24, and keyboard 22 is well known to those skilled in the art and is employed in commercially available television receivers. For example, such apparatus is employed in model number FFR488WR, FFR498WR, GFR760TR, GFR763BR, GFR763TR, GFR765LR, GFR765HR, GFR768SR, MFR419R, MFR588R, MFR589R television receivers including a type MSC03RA tuner, a type MST007RA tuner control unit, a type MCR016RA remote control transmitter, and a type CRK28 remote control receiver and a type CTC-111 signal processing chassis sold by RCA Corporation, Indianapolis, Ind. and described in "RCA Television Service Data", File 1981, C-3 and "RCA Television Service Data Supplement", File 1981, C-3-S1. Accordingly, elements 11, 18, 19, 22, 24 and 28 need not be described in detail herein.

The video signal developed by tuner and demodulator 11 is coupled through resistor R to RF modulator 30. An RF carrier signal at a carrier frequency corresponding to either VHF channel 3 or VHF channel 4 developed by RF oscillator 32 is coupled to RF modulator 30 so that a respective RF carrier modulated according to the video information is provided at the RF output terminal from which it can be coupled to the antenna terminals of a conventional TV receiver. Apparatus corresponding to RF modulator 30 and oscillator 32 is well known to those skilled in the art and is commercially available in the SFT 100 SelectaVision Video Disc Player sold by RCA Corporation, Indianapolis, Ind. and described in "SFT 100 Player Technical Manual", RCA Corporation, 1980, pages 59–61. Accordingly, RF modulator 30 and oscillator 32 need not be described in detail herein.

Cable converters such as 10 sometimes have provisions for high-fidelity reproduction of the audio portion of a TV program. To this end, audio demodulator 52, which is conventionally included within tuner and demodulator 11, extracts the audio portion from the IF signal and supplies the demodulated audio signal to an audio output terminal.

In so-called "pay" cable systems, the video and audio information for certain channels may be encoded or "scrambled". To decode the audio and video information on these channels, audio demodulator 50 may include a descrambler, and a video descrambler 52 may be interposed between tuner and demodulator 11 and RF modulator 30. When a scrambled channel is selected by entering its corresponding two-digit channel number, band decoder 19 responds by generating a DS (De-Scramble) signal which is applied to the descrambler in audio demodulator 50 and video descrambler 52 to enable their respective descrambling operations. The audio and video signals are applied to RF modulator 30 to produce an RF carrier at the frequency of channel 3 or 4 modulated with the descrambled audio and video information in the standard NTSC format. Descramblers for such purpose are well known and need not be described herein. For example, the audio and video descramblers may be similar to those employed in the Models 90 and 5810 Converter/Descramblers sold by Magnavox CATV Systems, Inc., Manlius, N.Y. or the SSAVI-I Decoder sold by American Television & Communications Corporation, Englewood, Colo. Accordingly, descramblers 50 and 52 need not be described in detail herein.

In order to develop a display of the cable channel number or indication of whether the VCR or VDP has been selected as the RF input source on the screen of the television receiver to which the modulated RF carrier provided at the RF output terminal is coupled, a character generator 40 is included in converter 10 to produce character representative signals. These character representative signals are combined with the video signal which is remodulated to produce the modulated RF carriers available at the RF output terminal. Specifically, sync separator 42, which may be of conventional design such as the sync separator employed in the CTC-111 signal processing chassis referred to above, develops horizontal synchronization signal HS and vertical synchronization signal VS from the video signal. Character generator 40 receives the synchronizing signals HS and VS and digit signals MSD and LSD and develops character signals WS and BS which represent white and black character portions, respectively. The WS and BS signals are inserted into the video signal by a combiner 43 at the appropriate times to develop alphanumeric character displays in a predetermined position on the screen of the TV receiver. The WS signal has a magnitude which tends to cause white clamp device 44 to produce a white picture display and the BS drive has a magnitude which tends to cause black clamp device 46 to produce a black picture display.

A satisfactory embodiment of character generator 40 and combiner 43 is described in U.S. Pat. No. 3,984,828 entitled CHARACTER GENERATOR FOR TELEVISION CHANNEL NUMBER DISPLAY WITH EDGING PROVISIONS, issued to B. W. Beyers, Jr. on Oct. 5, 1976, which is hereby incorporated herein by reference. In addition, the MM58146 integrated circuit commercially available from National Semiconductor Corporation, Santa Clara, Calif. is an on-screen TV channel (and time) character generator suitable for use as character generator 40. On-screen character display information is developed at times when tuning control unit 18 develops an on-screen display (OSD) enable signal which is generated by tuning control unit 18 and applied to character generator 40. The OSD signal can be developed automatically whenever a new channel selection is made or can be developed into the viewer activating a recall button also provided on keyboard entry device 22.

Modifications are contemplated to be within the scope of the present invention, the scope of which being limited only by the claims following. For example, it is contemplated that signal converter 10 could be incorporated in a VCR or VDP. In that event, the video signal produced by these devices would be coupled directly to the video signal output of the tuner and demodulator 11 by an input selector switch.

In addition, character generator 40 is readily modified to display any desired alphanumeric indications. For example, character generator 40 can be modified so that when switch S1 couples VCR input 14 to unit 11, character generator 40 recognizes the digit indications MSD and LSD associated therewith to develop an on-screen display of the letters "VR" thereby identifying the VCR as the source of TV signals being viewed. Similarly, generator 40 could develop signals representing the "VD" when S1 couples video disc input 16 to unit 11.

What is claimed is:

1. A signal converting apparatus for television signals comprising:
   input means including RF input means for providing a plurality of modulated RF carriers;
   tuning and demodulating means for selecting one of said modulated RF carriers and for developing a video signal from said selected modulated RF carrier in response to a carrier selection control signal;
   selection means coupled to said tuning and demodulating means for generating said carrier selection control signal;
   detection means for developing a synchronization signal responsive to said video signal;
   character generator means responsive to said carrier selection control signal and to said synchronization signal for generating a character signal identifying the selected one of said RF carriers;
   combining means for combining said video signal and said character signal; and
   modulating means for modulating said combined video and character signals on a second radio frequency carrier signal.

2. The apparatus recited in claim 1 wherein:
   said input means includes video input means for providing a video signal and switching means for selectively coupling said plurality of modulated carriers to said tuner and demodulator means and said video signal to said combining means in response to an input selection signal;
   said selection means includes input selection means for generating said input selection signal; and
   said character generator means is also responsive to said input selection control signal for causing said character signal to identify the selected one of said RF carriers when said RF carriers are coupled to said tuner and demodulating means and to identify the selection of said video source when said video signal is coupled to said combining means.

3. The apparatus of claim 1 wherein said selection means further comprises:
  entry means for producing an indication of a selection of one of said television signals;
  control means for developing said carrier selection control signal in accordance with said indication; and
  means for coupling said indication to said control means for effecting said development of said carrier selection control signal.

4. The apparatus of claim 3 wherein said means for coupling includes: transmission means for transmitting the indication produced by said entry means; and receiver means for receiving said transmitted indication and coupling it to said control means.

5. The apparatus of claim 1 wherein said combining means includes clamping means responsive to said character signal for making the magnitude of said video signal exceed the range of magnitudes otherwise associated with said video signal.

6. The apparatus of claim 5 wherein said clamping means makes the magnitude of said video signal exceed said range in a first direction in response to a first portion of said character signal and exceed said range in a second direction opposite to the first direction in response to a second portion of said character signal.

7. The apparatus of claim 1 further comprising decoding means interposed between said tuning means and said combining means for decoding encoded portions of said video signal.

8. The apparatus of claim 1 wherein said tuning and demodulating means includes a demodulator to which said selected modulated RF carrier is coupled for developing an audio signal therefrom.

9. The apparatus of claim 8 wherein said modulating means includes means receiving said audio signal for also modulating said audio signal on said second radio frequency carrier signal in addition to said combined video and character signals.

* * * * *